US007167477B2

(12) United States Patent
Kim

(10) Patent No.: US 7,167,477 B2
(45) Date of Patent: Jan. 23, 2007

(54) APPARATUS AND METHOD FOR RECOVERING ABNORMAL CONTROL CELLS IN ASYNCHRONOUS TRANSFER MODE EXCHANGE SUBSCRIBER UNIT

(75) Inventor: Ki-Taek Kim, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 1085 days.

(21) Appl. No.: 10/022,622

(22) Filed: Dec. 20, 2001

(65) Prior Publication Data
US 2002/0080793 A1    Jun. 27, 2002

(30) Foreign Application Priority Data
Dec. 21, 2000    (KR)   ............................. 2000-79419

(51) Int. Cl.
*H04L 12/56* (2006.01)
*H04J 3/06* (2006.01)

(52) U.S. Cl. .................. 370/395.1; 370/413; 370/350; 370/389; 370/395.7; 370/395.71; 370/347; 370/392; 370/398; 370/399; 370/422; 370/345

(58) Field of Classification Search ................ 370/389, 370/395.1, 395.7, 395.71, 412, 413, 395.6, 370/350, 392, 398, 399, 345
See application file for complete search history.

(56) References Cited
U.S. PATENT DOCUMENTS
5,974,047 A * 10/1999 Kim ...................... 370/395.41

6,175,567 B1 * 1/2001 Yoo ......................... 370/395.7
6,690,670 B1 * 2/2004 Castellano ............... 370/395.1
6,751,233 B1 * 6/2004 Hann ......................... 370/466
6,975,651 B1 * 12/2005 Ono et al. .................. 370/474

* cited by examiner

*Primary Examiner*—Ricky Q. Ngo
*Assistant Examiner*—Feben Micael Haile
(74) *Attorney, Agent, or Firm*—Fleshner & Kim, LLP

(57) ABSTRACT

An apparatus and method for recovering abnormal control cells in an asynchronous transfer mode (ATM) exchange subscriber unit. A signal cell or control cell is transmitted and a plurality of reception first-in first-out memories (FIFOs) are sequentially checked to determine whether a new cell has arrived. If there is no start of cell (SOC) signal in an initial byte of a current cell under the condition that a cell synchronization loss signal is present in the current cell, or if the SOC signal is detected during transfer of the current cell, the current cell is determined to be abnormal. If the cell synchronization loss signal is abnormal, the current cell is discarded and an associated FIFO is fully emptied to recover cell synchronization. According to the invention, an internal control cell having a command to be transferred to an ATM exchange subscriber interface, and subscriber interface state information to be reported to a controller, and a signal cell for call control between ATM exchanges are recovered rapidly and effectively when being abnormally transferred to the subscriber interface. Therefore, the subscriber interface can fundamentally be prevented from being erroneously operated and falling into an operation disable state, thereby enhancing stability of the subscriber unit.

13 Claims, 8 Drawing Sheets

APPARATUS AND METHOD FOR RECOVERING ABNORMAL CONTROL CELLS IN ASYNCHRONOUS TRANSFER MODE EXCHANGE SUBSCRIBER UNIT

BACKGROUND OF THE INVENTION

1. Field of the Invention

The present invention relates to a technique for recovering the contents of cells operating an asynchronous transfer mode (ATM) exchange when being abnormally inputted into the ATM exchange, and more particularly to an apparatus and method for recovering abnormal control cells in an ATM exchange subscriber unit, wherein internal control cells and signal cells to be processed by a subscriber interface are recovered rapidly and effectively when being abnormally transferred to the subscriber interface.

2. Description of the Related Art

An exchange generally functions to form a signal transfer path between two or more users so as to exchange conversation and data information therebetween.

The exchange inputs a subscriber signal and connection request signal at an ingress line, and separates the connection request signal from the subscriber signal to detect the connection request signal. Thereafter, the exchange selects an egress line through which the subscriber signal is to be transmitted, and sets up a path between the ingress line and the egress line.

Upon detecting no signal transfer or a connection release signal while monitoring the ingress line-egress line path set up as described above, the exchange releases the setup path and calculates a fee for the path occupancy at a certain rate to charge the fee.

The above-mentioned exchange may be classified according to types of information or signals being transferred. For example, the exchange is called a telephone exchange when information or signals being transferred are of a voice type such as a conversation, a telegraph exchange when of a character type such as a message, and a data exchange when of an image information type.

On the other hand, an asynchronous transfer mode (ATM) is a transfer mode of the B-ISDN (broadband ISDN) determined in ITU-T (the successor of CCITT), 1988. This transfer mode is a transfer and switching technique that is the kernel of the B-ISDN.

The ATM serves to partition all data information to be transferred between exchanges into ATM cells, which are block or packet units with fixed data lengths, and transfer the partitioned ATM cells in order.

An ATM cell has a fixed length of 53 bytes, the first 5 bytes forming a header and the remaining 48 bytes forming an information field or payload field. This fixed length ATM cell or data stream is a basic unit of multiplex communication or multiplex switching.

Written in the 5-byte header are start of cell (SOC) information indicative of a start point of the ATM cell, a virtual channel identifier (VCI) for identification of connection information associated with the cell, a virtual path identifier (VPI), a cell loss priority (CLP) indicative of cell discard allowance or disallowance when a congestion occurs in signals to be transferred, payload type identification (PTI) information for identification of network control information, header error control (HEC) information for detection and control of a header error, etc.

Statistics show that the ATM-based multiplex switching is characterized in that it can obtain a higher multiplexing efficiency than time division multiplex switching and freely vary/set transfer bandwidths to be assigned to respective communications.

Because the routing information as stated above is written in the cell header, an ATM exchange can relay and switch payload cell contents by itself by analyzing the cell header. Further, the relay or switching operation can be realized in a hardware manner, thereby enhancing a switching rate.

The ATM exchange has line units of two levels, a virtual path (VP) and a virtual channel (VC) The ATM exchange also performs a packet switching operation of a high transfer efficiency to settle problems with a circuit switching operation, such as a switching delay and a degradation in circuit utilization efficiency, thereby processing a variety of information at high speed.

The ATM exchange processes cells that are roughly classified into three types, a user cell, an internal control cell and a signal cell.

The user cell is composed of a voice or data signal transferred from a subscriber to the ATM exchange, which signal has payload cell contents.

The internal control cell may be defined and operated in different manners with respect to respective ATM exchanges. Generally, the internal control cell is used for internal communication between a control unit that manages the entire operation of the ATM exchange and each function block or function unit. To this end, the internal control cell is composed of function block state report information, state monitor information, connection registration information, connection release information, etc.

The signal cell is composed of call control signaling information, connection information, connection accept information, routing information, etc. for point to point connection setup, release information, release completion information, etc. for set-up connection release, and state information, state query information, restart information, restart accept information, etc. for connection management.

The signal cell is further composed of counterpart addition information, counterpart addition accept information, etc. for point to multi-point connection setup, and counterpart removal information, counterpart removal accept information, etc. for set-up connection release.

The control cell and signal cell are important signals for a switching operation of the ATM exchange for transfer of the user cell to a destination. The control cell and signal cell are transferred and processed along the same paths in some parts of the ATM exchange, and along different paths in the other parts thereof.

In other words, the user cell is switched and transferred to an associated destination through a processing operation of an ATM exchange level, not processed by an associated controller in a subscriber interface of the ATM exchange.

The signal cell and control cell, which are composed of the header cell contents as mentioned above, are processed by associated controllers in the subscriber interface of the ATM exchange.

The signal cell, which constitutes the ATM cell together with the user cell, is outputted from a different ATM exchange and then inputted to the subscriber interface of the ATM exchange over a physical layer.

The subscriber interface separates the signal cell from the input ATM cell consisting of the signal cell and user cell, and transfers it to the associated controller for processing thereof.

The control cell, which is defined in the ATM exchange, is transferred to a switch of the ATM exchange together with the user cell. The switch separates the control cell from the user cell and transfers it to a main controller of the ATM exchange.

Now, a description will be given of a conventional method for processing control cells in an ATM exchange with reference to the accompanying drawings.

FIGS. 1 to 3 illustrate the conventional control cell processing method, wherein FIG. 1 is a functional block diagram of a conventional ATM exchange, FIG. 2 is a detailed functional block diagram of a subscriber unit in FIG. 1, and FIG. 3 is a flow chart illustrating the conventional control cell processing method.

With reference to FIG. 1, the conventional ATM exchange comprises a main controller 1 for monitoring respective function blocks of the ATM exchange and generating control signals associated with the respective function blocks as a result of the monitoring, a plurality of subscriber units 3 and 7 each connected to a subscriber or a different ATM exchange for transmitting and receiving ATM cells thereto/therefrom, and a switch 5 for switching an output signal from each of the subscriber units 3 and 7 to an associated path in response to a corresponding control signal from the main controller 1.

With reference to FIG. 2, the subscriber unit, for example, 3 includes a controller 10 for monitoring and managing the entire operation of the subscriber unit and outputting control signals and processed signals, and a first-in first-out memory (FIFO) unit 30 for temporarily storing and outputting input signal cells in an FIFO manner in response to an associated control signal. The FIFO units 30 may include, for example, eight FIFOs.

The subscriber unit 3 further includes a FIFO manager 20 for transmitting and receiving signals to/from the controller 10 according to a Utopia level-2, which is a standard protocol proposed in ITU-T (the successor of CCITT). The FIFO manager 20 generates the above control signal to the FIFO unit 30 in response to a control signal from the controller 10 to control and manage the input and output of signals in the FIFO unit 30. The FIFO manager 20 is also adapted to input or output signals from/to the FIFO unit 30.

With reference to FIG. 3, the conventional subscriber unit cell processing method comprises steps ST11 and ST12 of sequentially checking the eight FIFOs of the FIFO unit 30 to determine whether a new signal cell has arrived at the FIFO unit 30, and steps ST13 and ST14 of, if it is determined at the above step ST12 that the new signal cell has arrived, storing in a register of the FIFO manager 20 a FIFO address in which the contents of the new signal cell are stored and determining whether the transmission of a different signal cell has been completed.

The conventional cell processing method further comprises steps ST15 and ST16 of, if it is determined at the above step ST14 that the transmission of the different signal cell has been completed, selecting a FIFO address of the FIFO unit 30 at which the first signal cell has arrived, setting the selected FIFO address as a physical address and determining whether signal cell contents from the set physical address have been received, and step ST17 of, if it is determined at the above step ST16 that the signal cell contents from the set physical address have been received, monitoring whether the subsequent new signal cell has arrived at the FIFO unit 30.

The above steps ST11–ST17 are performed by the controller 10 in the subscriber unit 3.

A detailed description will hereinafter be given of a conventional subscriber unit cell processing method with reference to FIG. 3.

A cell applied to the ATM exchange subscriber unit 3 is temporarily stored in a connected one of the eight FIFOs of the FIFO unit 30.

The controller 10 in the subscriber unit 3 sequentially checks the eight FIFOs of the FIFO unit 30 (ST11) to determine whether a new signal cell of an ATM cell has arrived at the FIFO unit 30 (ST12).

Upon determining at the above step ST12 that the new signal cell has arrived, the controller 10 stores in the register of the FIFO manager 20 a FIFO address in which the contents of the new signal cell are stored (ST13) and determines whether the transmission of a different cell has been completed (ST14).

Note that the FIFO unit 30 has eight FIFOs to accommodate two subscriber ports, and the FIFO manager 20 and the controller 10 share one Utopia data bus with each other to transmit and receive signals therebetween.

Accordingly, the FIFO manager 20 and the controller 10 have to transmit or receive one signal cell or control cell at one time. Provided that the FIFO manager 20 and the controller 10 desire to transmit or receive a plurality of signal cells or control cells at one time, the controller 10 has to determine and manage priorities of the control cells or signal cells with respect to the FIFO unit 30 through the FIFO manager 20.

In the case where it is determined at the above step ST14 that the transmission of the different cell has been completed, or that no transmission is conducted, the controller 10 selects a FIFO address of the FIFO unit 30 at which the first signal cell has arrived, from the register of the FIFO manager 20, and sets the selected FIFO address as a physical address to receive signal cell contents from the physical address (ST15). The controller 10 then determines whether all the signal cell contents from the physical address have been received (ST16).

If it is determined at the above step ST16 that all the signal cell contents from the set physical address have been received, the controller 10 monitors whether the subsequent new cell has arrived at the FIFO unit 30.

The above-stated control operation of the controller 10 will hereinafter be described in more detail.

1. The controller 10 and the FIFO manager 20 transmit and receive signals therebetween on the basis of a Utopia level-2 that is an ITU-T standard protocol.

2. The controller 10 acts as a master for determining priorities of signals to be transmitted and received.

3. The FIFO manager 20 manages the FIFO unit 30 having a total of eight FIFOs based on two subscriber signals, a signal cell reception_0 FIFO, IPC cell reception_0 FIFO, signal cell transmission_0 FIFO, IPC cell transmission_0 FIFO, signal cell reception_1 FIFO, IPC cell reception_1 FIFO, signal cell transmission_1 FIFO and IPC cell transmission_1 FIFO.

4. While transmitting a signal cell or control cell, the controller 10 sequentially checks the four reception FIFOs of the FIFO unit 30 to determine whether a new signal cell or control cell has arrived.

5. If the new cell has arrived at the FIFO unit 30, then the controller 10 stores a FIFO address of the new cell in the internal register of the FIFO manager 20.

6. If the controller 10 has completed transmission, then it selects a FIFO address of the FIFO unit 30 at which the first cell has arrived and sets the selected FIFO address as a physical address to receive cell contents from the physical address.

7. If the controller 10 starts to receive the cell contents, then it checks the FIFOs beginning with the FIFO subsequent to the current reception FIFO to determine whether a new cell has arrived.

The above-described conventional cell processing method is performed very well when cells are transmitted and received normally without errors.

However, the conventional cell processing method has neither an erroneous cell discard function nor erroneous cell recovery function. For this reason, where a signal cell or control cell is abnormally applied due to hardware problems and other various unusual situations (duplexed switching, noise signal input, misalignment of synchronous clocks and so forth), it cannot be discarded or recovered.

As a result, even though a normal cell has arrived, it is transferred to the controller 10 and in turn the ATM exchange main controller 1 in a continuously abnormal state.

Provided that the above state is maintained for a lengthy period of time, the ATM exchange main controller 1 will manage the subscriber unit 3 or 7 interfaced with the associated subscriber, in an abnormal state or operation disable state, resulting in a significant degradation in stability of the subscriber unit.

SUMMARY OF THE INVENTION

Therefore, the present invention has been made in view of the above problems, and it is an object of the present invention to provide an apparatus and method for recovering abnormal control cells in an ATM exchange subscriber unit, wherein an internal control cell having a call control command to be transferred to an ATM exchange subscriber interface, and subscriber interface state information to be reported to a controller, and a signal cell for call control between ATM exchanges are recovered rapidly and effectively when being abnormally transferred to the subscriber interface, thereby fundamentally preventing the subscriber interface from being erroneously operated and falling into an operation disable state, so as to enhance stability of the subscriber unit.

In accordance with one aspect of the present invention, the above and other objects can be accomplished by the provision of an apparatus for recovering abnormal control cells in an asynchronous transfer mode (ATM) exchange subscriber unit, comprising a controller for monitoring and controlling the entire operation of the subscriber unit, discarding abnormal cells and recovering cell synchronization; a first-in first-out memory (FIFO) manager connected to the controller for transmitting and receiving cells to/from the controller; reception FIFO means for temporarily storing a cell received from a different ATM exchange and transmitting the stored cell to the FIFO manager; and transmission FIFO means for temporarily storing a cell transmitted from the FIFO manager and transmitting the stored cell externally.

In accordance with another aspect of the present invention, there is provided a method for recovering abnormal control cells in an asynchronous transfer mode (ATM) exchange subscriber unit, comprising the steps of a) transmitting a signal cell or control cell and then sequentially checking a plurality of reception first-in first-out memories (FIFOs) to determine whether a new cell has arrived; b), if there is no start of cell (SOC) signal in an initial byte of a current cell under the condition that a cell synchronization loss signal is present in the current cell, or if the SOC signal is detected during transfer of the current cell, after the step a) is performed, recognizing that the current cell is abnormal; and c), if the cell synchronization loss signal is abnormal at the step b), discarding the current cell and fully emptying an associated FIFO to recover cell synchronization.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 4:
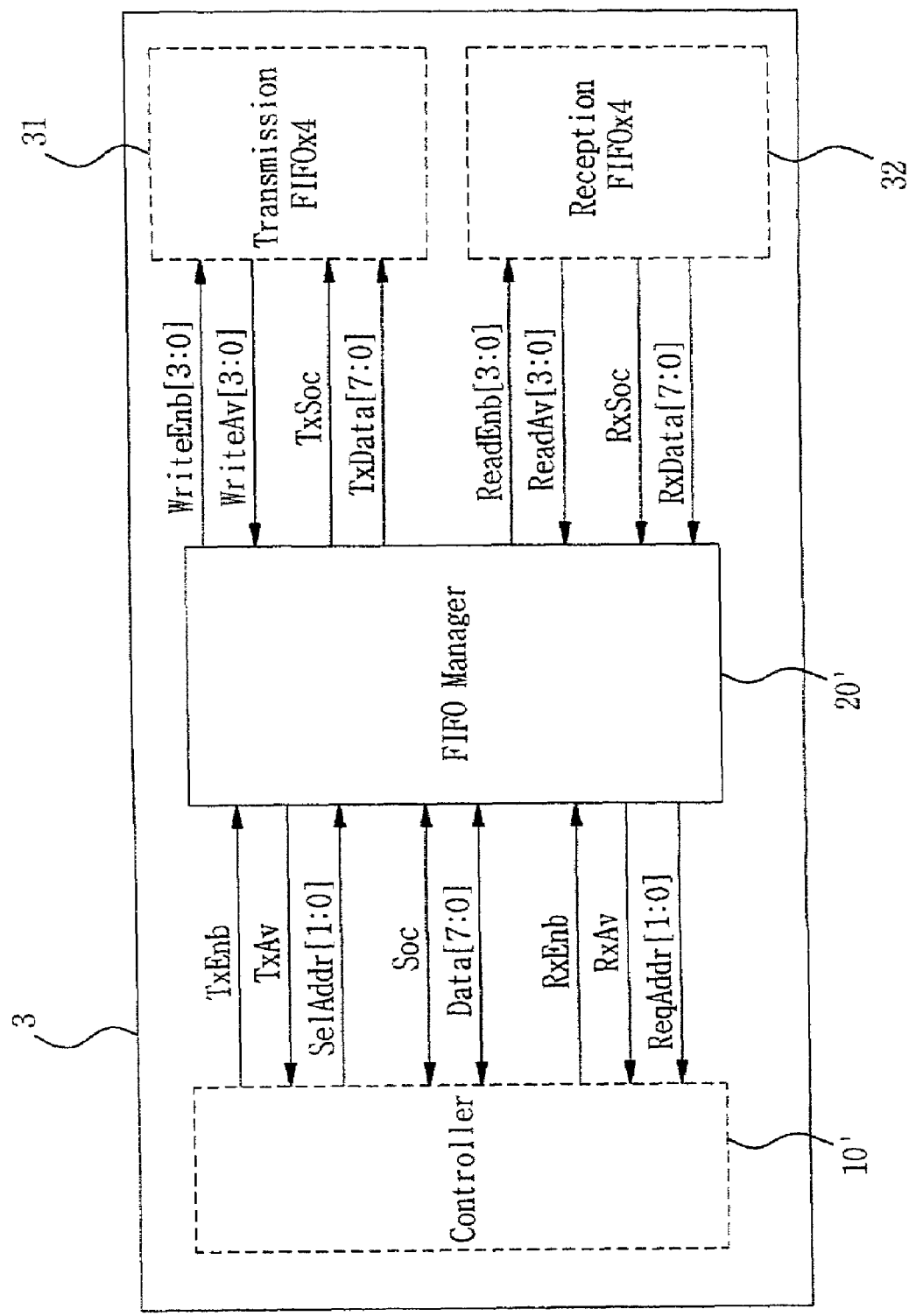
FIG. 4 is a functional block diagram of an ATM exchange subscriber unit to which the present invention is applied.
Figure 5:
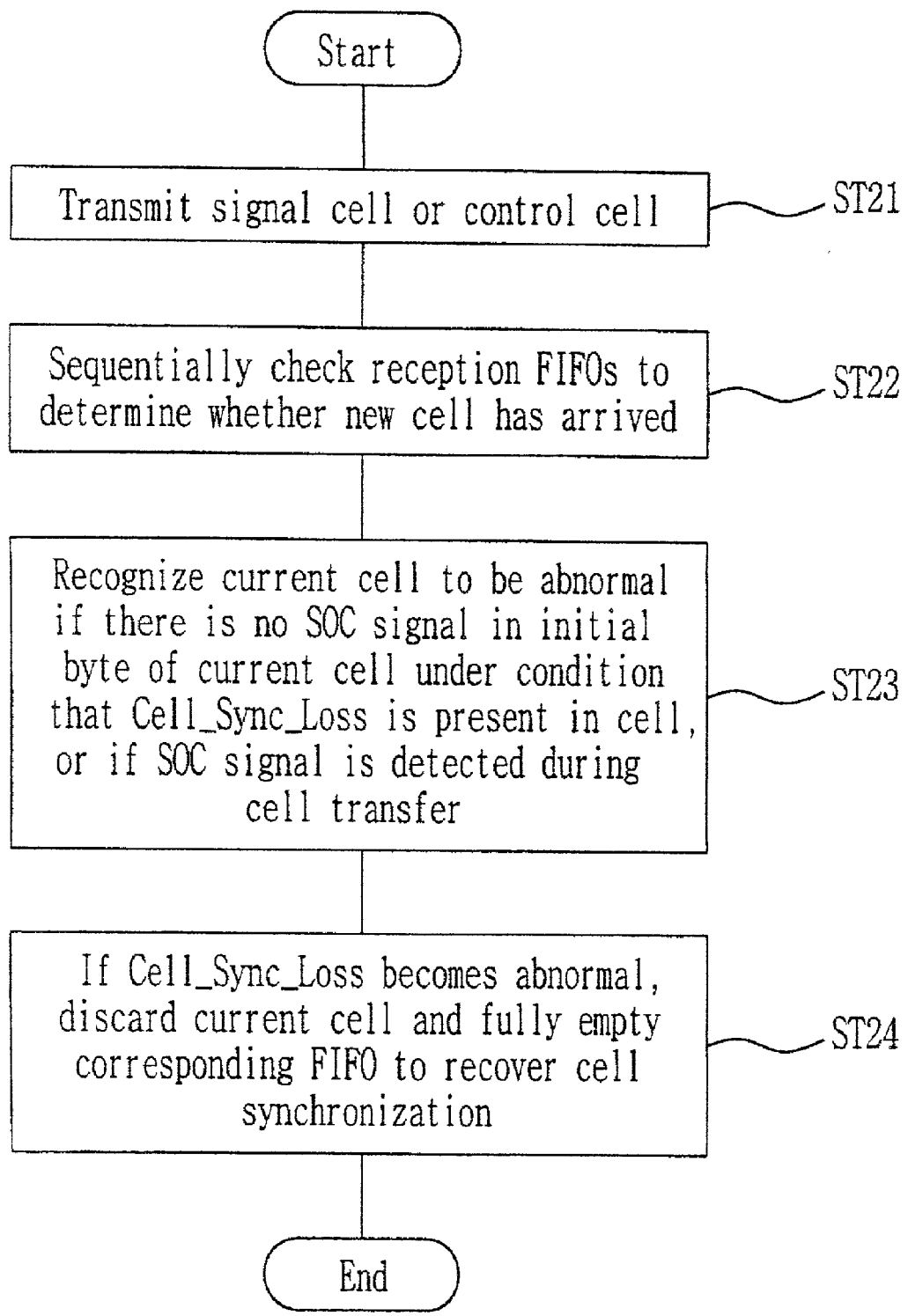
FIG. 5 is a flow chart illustrating a method for recovering abnormal control cells in the ATM exchange subscriber unit in accordance with the present invention.
Figure 6A:
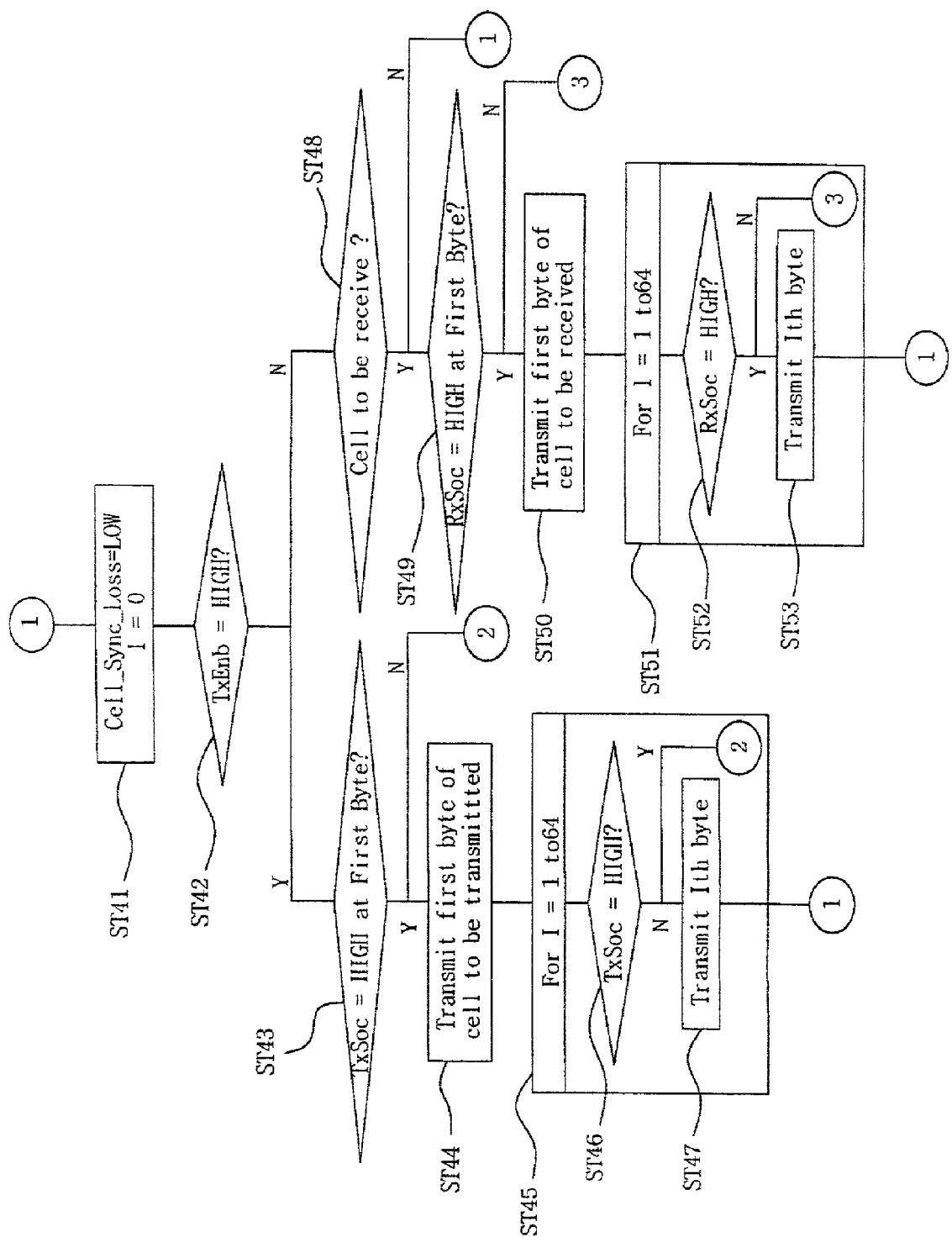
FIGS. 6a to 6c are flow charts illustrating in detail a control cell recovery step in FIG. 5.
Figure 6B:
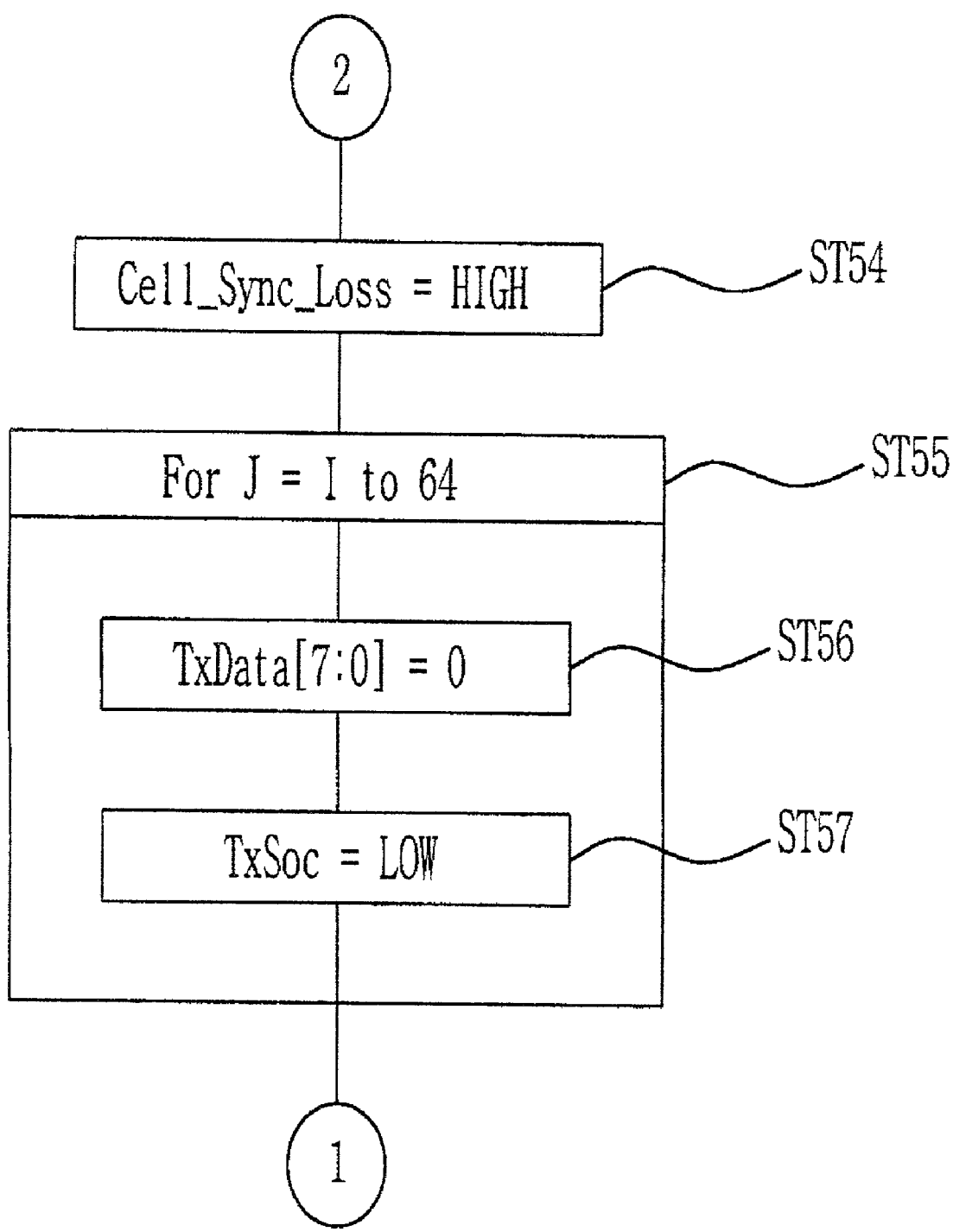
Figure 6C:
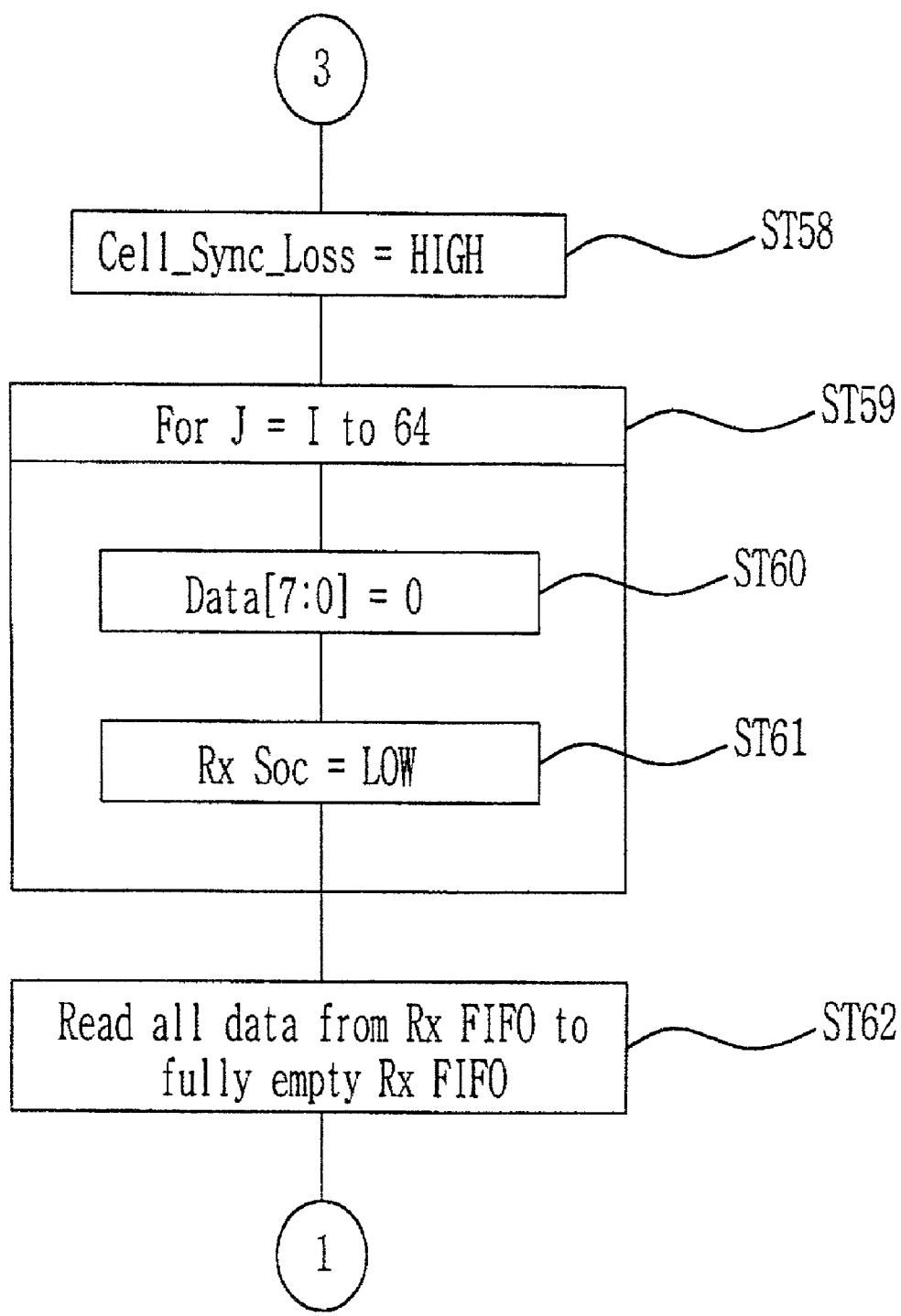

FIGS. 4 to 6c illustrate a preferred embodiment of the present invention, wherein FIG. 4 is a functional block diagram of an ATM exchange subscriber unit to which the present invention is applied, FIG. 5 is a flow chart illustrating a method for recovering abnormal control cells in the ATM exchange subscriber unit in accordance with the present invention, and FIGS. 6a to 6c are flow charts illustrating in detail a control cell recovery step in FIG. 5.

With reference to FIG. 4, the ATM exchange subscriber unit 3 comprises a controller 10' for managing and monitoring the entire operation of the subscriber unit 3 and reading and transferring cells, and a FIFO manager 20' connected to the controller 10' over a single Utopia level-2 path for transmitting and receiving cells to/from the controller 10'. The FIFO manager 20' is operated in response to a reception enable signal RxEnb from the controller 10' to output a reception approval signal RxAv to the controller 10' and transmit a cell to the controller 10' over the Utopia level-2 path. The FIFO manager 20' is also operated in response to a transmission enable signal TxEnb from the controller 10' to output a transmission approval signal TxAv to the controller 10' and receive a cell transmitted from the controller 10' over the Utopia level-2 path.

The ATM exchange subscriber unit 3 further comprises a reception FIFO unit 32 for temporarily storing a cell that is a control signal received from a different ATM exchange. The reception FIFO unit 32 is operated in response to a read enable control signal ReadEnb from the FIFO manager 20' to output a read approval control signal ReadAV to the FIFO manager 20' and transmit the stored cell as a combination of a reception synchronous signal RxSoc and data RxData[7:0] to the FIFO manager 20'.

The ATM exchange subscriber unit 3 further comprises a transmission FIFO unit 31 responsive to a write enable control signal WriteEnb from the FIFO manager 20' for outputting a write approval control signal WriteAv to the FIFO manager 20' and receiving a cell transmitted from the FIFO manager 20' as a combination of a transmission synchronous signal TxSoc and data TxData[7:0]. The transmission FIFO unit 31 temporarily stores the received cell and then transmits it to the switch 5 in FIG. 1.

Explaining the above control signals in more detail, TxEnb denotes a control signal indicative of the presence of a cell to be transmitted from the controller 10' to the FIFO manager 20', and TxAv denotes a control signal allowing the controller 10' to transmit the cell to the FIFO manager 20'.

RxEnb denotes a control signal indicating that the controller 10' is ready to receive a cell from the FIFO manager 20', and RxAv denotes a control signal indicating that the FIFO manager 20' is ready to transmit the cell to the controller 10'.

Soc denotes a synchronous signal indicative of the start of a cell, Data[7:0] denotes a byte-unit signal to be transmitted or received, WriteEnb[3:0] denotes a control signal indicating that a data writing operation is ready to be performed, and WriteAv[3:0] denotes a control signal approving the data writing operation.

TxSoc denotes a synchronous signal indicative of the start of transmission data, TxData[7:0] denotes byte-unit transmission data, ReadEnb[3:0] denotes a control signal indicating that a data reading operation is ready to be performed, and ReadAv[3:0] denotes a control signal approving the data reading operation. RxSoc denotes a synchronous signal indicative of the start of reception data, and RxData[7:0] denotes byte-unit reception data.

With reference to FIG. 5, the abnormal control cell recovery method according to the present invention comprises steps ST21 and ST22 of transmitting a signal cell or control cell and sequentially checking four reception FIFOs of the reception FIFO unit 32 to determine whether a new cell has arrived.

The abnormal control cell recovery method further comprises step ST23 of, if there is no start of cell (SOC) signal in the initial byte of a current cell in transmission or reception under the condition that a cell synchronization loss signal Cell_Sync_Loss is present in the current cell, or if the SOC signal is detected during the transfer of the current cell, after the above step ST22 is performed, determining that the current cell is erroneous and recognizing that the cell is abnormal.

The abnormal control cell recovery method further comprises step ST24 of, if the cell synchronization loss signal Cell_Sync_Loss becomes abnormal after the above step ST23 is performed, discarding the current cell in transmission or reception and fully emptying the reception FIFO unit 32 or transmission FIFO unit 31 to recover cell synchronization.

The above steps ST21–ST24 are performed by the controller 10' in the ATM exchange subscriber unit 3.

Now, a detailed description will be given of the above-mentioned abnormal control cell recovery method in accordance with the present invention with reference to FIGS. 4 to 6c.

First, upon receiving an ATM cell from a different ATM exchange, the ATM exchange subscriber unit 3 separates a 5-byte head cell, which is a signal cell, from the received ATM cell and applies the separated head cell to an empty one of the four FIFOs constituting the reception FIFO unit 32.

The controller 10' outputs the reception enable signal RxEnb to the FIFO manager 20', thereby allowing the manager 20' to output the read enable control signal ReadEnb to the reception FIFO unit 32.

In response to the read enable control signal ReadEnb from the FIFO manager 20', the reception FIFO unit 32 outputs the read approval control signal ReadAV to the manager 20' because signal cells are present in the four FIFOs thereof. The reception FIFO unit 32 then transmits the reception synchronous signal RxSoc and byte-unit data RxData[7:0] to the FIFO manager 20'.

Upon receiving the byte-unit data from the reception FIFO unit 32, the FIFO manager 20' outputs the reception approval signal RxAv to the controller 10' together with an address request signal ReqAddr[1:0]. The FIFO manager 20' then transmits the SOC signal and byte-unit data Data[7:0] to the controller 10' over the Utopia level-2 data transfer path.

After receiving the byte-unit data from the FIFO manager 20', the controller 10' makes ready to transmit an internal control cell having function block state report information and state monitor information, and a signal cell having routing information.

Thereafter, the controller 10' outputs the transmission enable signal TxEnb to the FIFO manager 20', thereby allowing the manager 20' to output the write enable control signal WriteEnb[3:0] to the transmission FIFO unit 31.

When at least one of the four FIFOs constituting the transmission FIFO unit 31 is empty, the FIFO unit 31 outputs the write approval control signal WriteAv[3:0] to the FIFO manager 20' in response to the write enable control signal WriteEnb[3:0] from the manager 20'.

Upon receiving the write approval control signal WriteAv [3:0] from the transmission FIFO unit 31, the FIFO manager 20' outputs the transmission approval signal TxAv to the controller 10'.

In response to the transmission approval signal TxAv from the FIFO manager 20', the controller 10' outputs an address selection signal SelAddr[1:0] to the manager 20' and transmits the SOC signal and signal and control cells to the manager 20' over the Utopia level-2 data transfer path.

The FIFO manager 20' receives the above signals from the controller 10' and then transmits the received signal cell or control cell to the transmission FIFO unit 31 in the form of data TxData[7:0] together with the transmission synchronous signal TxSoc.

Upon receiving the data transmitted from the FIFO manager 20', the transmission FIFO unit 31 stores it in a corresponding one of the four FIFOs and then transmits the stored data to the switch 5 together with a user cell in response to an associated control signal from the controller 10'. As a result, the switch 5 switches the signal cell or control cell to an associated destination along with the user cell.

Control cells may be abnormally transmitted or received through the subscriber unit during the above procedure. Such an abnormal control cell can be recovered as in the following description, referring to FIG. 5.

The controller 10' assigns a higher priority to control cell transmission than control cell reception. Therefore, if there is a cell to be transmitted, the controller 10' performs the transmission operation first through the above procedure (ST21).

After completing the transmission operation at the above step ST21, the controller 10' sequentially checks the four FIFOs of the reception FIFO unit 32 on the basis of the reception enable signal RxEnb and the read enable control signal ReadEnb from the FIFO manager 20' to determine whether a new cell has been received and stored (ST22).

In the case where it is determined at the above step ST22 that the new cell has been received and stored, the controller 10' reads the stored cell through the above procedure.

While a cell is read or received, if there is no SOC signal in the initial byte of the cell under the condition that the cell synchronization loss signal Cell_Sync_Loss is present in the cell, or if the SOC signal is detected during the cell reception, the controller 10' recognizes that the cell has been abnormally received (ST23).

After recognizing that the cell has been abnormally received, the controller 10' determines whether the cell synchronization loss signal Cell_Sync_Loss has been set in the cell Upon determining that the cell synchronization loss signal Cell_Sync_Loss has not been set in the cell, the controller 10' discards the cell by setting the remaining bytes of the cell in transmission to '0', namely, filling them with '0'. The controller 10' then recovers cell synchronization by fully emptying an associated one of the FIFOs of the reception FIFO unit 32 (ST24).

A more detailed description will hereinafter be given of the above-stated abnormal control cell recovery method in accordance with the present invention in conjunction with the respective function blocks and control signals of FIG. 4 and flow charts of FIGS. 6a to 6c.

In the case where a cell is received with the cell synchronization loss signal Cell_Sync_Loss set normally to, for example, a low level, therein (ST41), the controller 10' recognizes that the cell is in normal synchronization.

When the cell is in the normal synchronization, the FIFO manager 20' determines whether the transmission enable signal TxEnb from the controller 10' is, for example, high in level (ST42).

If it is determined at the above step ST42 that the transmission enable signal TxEnb is high in level, the FIFO manager 20' determines whether the transmission synchronous signal TxSoc is, for example, high in level at the first byte of the cell (ST43).

Where the transmission synchronous signal TxSoc is determined to be high in level at the above step ST43, the FIFO manager 20' transmits the first byte of the cell to the transmission FIFO unit 31 (ST44) and then checks the subsequent byte of the cell (ST45) to determine whether the transmission synchronous signal TxSoc is high in level at the subsequent byte (ST46). If the transmission synchronous signal TxSoc is determined to be high in level at step ST46, the FIFO manager 20' transmits the subsequent byte of the cell to the transmission FIFO unit 31 (ST47).

The above steps ST45–ST47 are repeated until the last byte of the cell, or control cell, is transmitted. In the present embodiment, the control cell is composed of, for example, 64 bytes.

The control cell is generated by the signal cell receiving controller 10' in such a manner that it includes function block state monitor and report information. This control cell is defined to have 64 bytes in the present embodiment although it may be different in size according to ATM exchanges.

On the other hand, in the case where it is determined at the above step ST43 or ST46 that the transmission synchronous signal TxSoc is low in level, the FIFO manager 20' recognizes that the cell is not in the normal synchronization, namely, the cell is erroneous. As a result, the FIFO manager 20' changes or sets transmission data TxData[7:0] to '0' (ST56) from the time when the transmission synchronous signal TxSoc is detected to be low in level (ST55) under the condition that the cell synchronization loss signal Cell_Sync_Loss is high in level (ST54). Thereafter, the FIFO manager 20' sets the transmission synchronous signal TxSoc to be low in level (ST57), and the method then returns to the above step ST41.

If the transmission enable signal TxEnb is determined to be low in level at the above step ST42, the FIFO manager 20' recognizes that there is no cell to be transmitted from the controller 10'. In this case, the controller 10' sequentially checks the FIFOs of the reception FIFO unit 32 to determine whether there is a new cell to be received (ST48).

In the case where it is determined at the above step ST48 that there is no new cell to be received, the method returns to the above step ST41. However, if there is a new cell to be received, the FIFO manager 20' determines whether the reception synchronous signal RxSoc is, for example, high in level at the first byte of the cell (ST49).

If the reception synchronous signal RxSoc is determined to be high in level at the above step ST49, the FIFO manager 20' transmits the first byte of the cell, Data[7:0], to the controller 10' over the Utopia level-2 path (ST50).

After transmitting the first byte of the cell, the FIFO manager 20' checks the subsequent byte of the cell (ST51) to determine whether the reception synchronous signal RxSoc is high in level at the subsequent byte (ST52).

If the reception synchronous signal RxSoc is determined to be high in level at the above step ST52, the FIFO manager 20' transmits the subsequent byte of the cell to the controller 10' (ST53).

The above steps ST51–ST53 are repeated until all bytes of the cell, for example, 64 bytes are transmitted.

On the other hand, in the case where it is determined at the above step ST49 or ST52 that the reception synchronous signal RxSoc is low in level, the FIFO manager 20' changes all the cell byte data to '0' (ST59 and ST60) under the condition that the cell synchronization loss signal Cell_Sync_Loss is high in level (ST58), and then transmits the resulting data to the controller 10'. Thereafter, the FIFO manager 20' sets the reception synchronous signal RxSoc to be low in level (ST61).

The above steps ST59–ST61 are repeated until all the bytes of the cell are transmitted.

Further, the FIFO manager 20' reads all data from an associated one of the FIFOs of the reception FIFO unit 32 to fully empty the associated FIFO (ST62), and the method then returns to the above step ST41.

As described above, in addition to the existing functions, the present invention provides a function of rapidly and effectively recovering signal cells and control cells when being abnormally transferred over various paths of the ATM exchange subscriber interface due to various unusual situations, thereby fundamentally preventing the subscriber interface from being erroneously operated and falling into an operation disable state.

The present invention further provides two functions, an abnormal cell discard function and a cell synchronization recovery function, to enhance an error recovery function of the control cell FIFO manager 20' provided for the transfer of information between the subscriber interface controller 10' and an external unit.

Note that a signal cell or control cell may be abnormally applied due to various factors, for example, partial data losses in duplexed switching, external noise signal input, misalignment of internal synchronous clocks and so forth.

In case a control cell is misaligned in its timing due to the above various factors, namely, the SOC signal is not detected at the normal position, the FIFO manager 20' recognizes that the cell synchronization is abnormal and the remaining bytes of the cell in transmission are insignificant, and then discards the cell in transmission. Subsequently, the FIFO manager 20' replaces the remaining bytes of the cell in transmission with "0" and transmits the resulting bytes.

Received cell synchronization recovery is attained in the following manner. That is, the cell synchronization loss signal is first set to its abnormal state. For cell synchronization, a corresponding FIFO of the reception FIFO unit 32 is fully emptied to make ready to receive a new normal cell. The cell synchronization loss signal is then restored to its normal state.

In other words, on the basis of the cell synchronization loss signal, a cell is determined to be normal if the SOC signal is normally present in the initial byte of the cell, whereas to be abnormal if the SOC signal is not present in the initial byte of the cell or it is detected during the cell transfer.

A basic structure of the present invention as stated above is as follows:

1. The interface between the controller 10' and the FIFO manager 20' is based on the Utopia level-2 that is an ITU-T standard protocol.

2. The controller 10' acts as a Utopia master for determining priorities of cells to be transmitted and received.

3. The FIFO manager 20', which transmits and receives signal and control cells, manages a total of eight FIFOs capable of accommodating two subscriber ports, or four reception FIFOs 32 and four transmission FIFOs 31.

4. While the controller 10' transmits signal and control cells, the FIFO manager 20' sequentially checks the four signal and control cell reception FIFOs 32 to determine whether a new cell has arrived.

5. The controller 10' and the FIFO manager 20' cannot transmit and receive cells at the same time because a single Utopia level-2 data bus is present therebetween.

6. The cell synchronization loss signal is present in the FIFO manager 20', and a cell is determined to be abnormal if the SOC signal is not present in the initial byte of the cell or it is detected during the cell transfer.

7. If the cell synchronization loss signal becomes abnormal, the cell discard function is performed to change the remaining bytes of a cell in transmission to "0" and transmit the resulting bytes, and the cell synchronization recovery function is performed to fully empty a corresponding FIFO to make ready to receive a new cell.

The above-stated operation of the present invention will hereinafter be described briefly again.

A determination is made from the TxEnb signal from the controller 10' as to whether there is a cell to be transmitted from the controller 10'. The control cell transmission is carried out by a cell transmission block of the controller 10'.

In the transmission process of the cell transmission block of the controller 10', the cell transmission is determined to be normally performed if the SOC signal normally appears in the initial byte of the cell and does not appear in the other cell transmission periods.

Otherwise, the cell transmission is determined to be abnormally performed, and bytes following a detected error portion are changed to "0" and then transmitted.

If the cell transmission is completed, the operation proceeds to a block for restoring the cell synchronization loss signal to its normal state and again determining whether there is a cell to be transmitted.

When there is a cell to be received by the controller 10', the SOC signal is also monitored for management of the cell synchronization loss signal state.

Provided that the SOC signal appears at a faulty position or does not appear in the initial byte of the cell, the cell synchronization loss signal becomes abnormal, and the remaining bytes of the cell in transmission are set to "0" and then transmitted. Further, a cell output FIFO of the reception FIFO unit 32 is fully emptied by reading and discarding all the remaining data therefrom.

If the cell output FIFO is fully emptied, the cell synchronization loss signal is restored to its normal state and a determination is then made as to whether there is a new control cell to be received.

Therefore, the present invention can avoid the continuous creation of erroneous control cells or the control cell transmission/reception disable states of the other FIFOs resulting from erroneous data remaining in the cell output FIFO.

As described above, when an internal control cell having a command to be transferred to the ATM exchange subscriber interface, and subscriber interface state information to be reported to the controller, and a signal cell for call control between ATM exchanges are abnormally transferred to the subscriber interface, many problems are caused in the subscriber interface and exchange. In order to solve such problems, according to the present invention, the abnormally transferred control cell and signal cell can be recovered rapidly and effectively, thereby fundamentally preventing the subscriber interface from being erroneously operated and falling into an operation disable state, so as to enhance stability of the subscriber unit.

As apparent from the above description, the present invention provides an apparatus and method for recovering abnormal control cells in an ATM exchange subscriber unit, wherein an internal control cell having a call control command to be transferred to an ATM exchange subscriber interface, and subscriber interface state information to be reported to a controller, and a signal cell for call control between ATM exchanges are recovered rapidly and effectively when being abnormally transferred to the subscriber interface. Therefore, the subscriber interface can fundamentally be prevented from being erroneously operated and falling into an operation disable state, thereby enhancing stability of the subscriber unit.

Further, in a conventional ATM exchange subscriber interface, even though signal and control cells become abnormal due to unexpected problems caused during transmission and reception thereof, they are continuously transferred in their abnormal state, thereby causing the subscriber interface to be erroneously operated or fall into an operation disable state. For this reason, an exchange controller cannot normally manage the subscriber interface. However, according to the present invention, even though abnormal signal and control cells are transferred to the subscriber interface, they can be recovered at once through cell discard and cell synchronization recovery procedures, thereby significantly enhancing stability of the subscriber interface.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DRAWING

Figure 1:
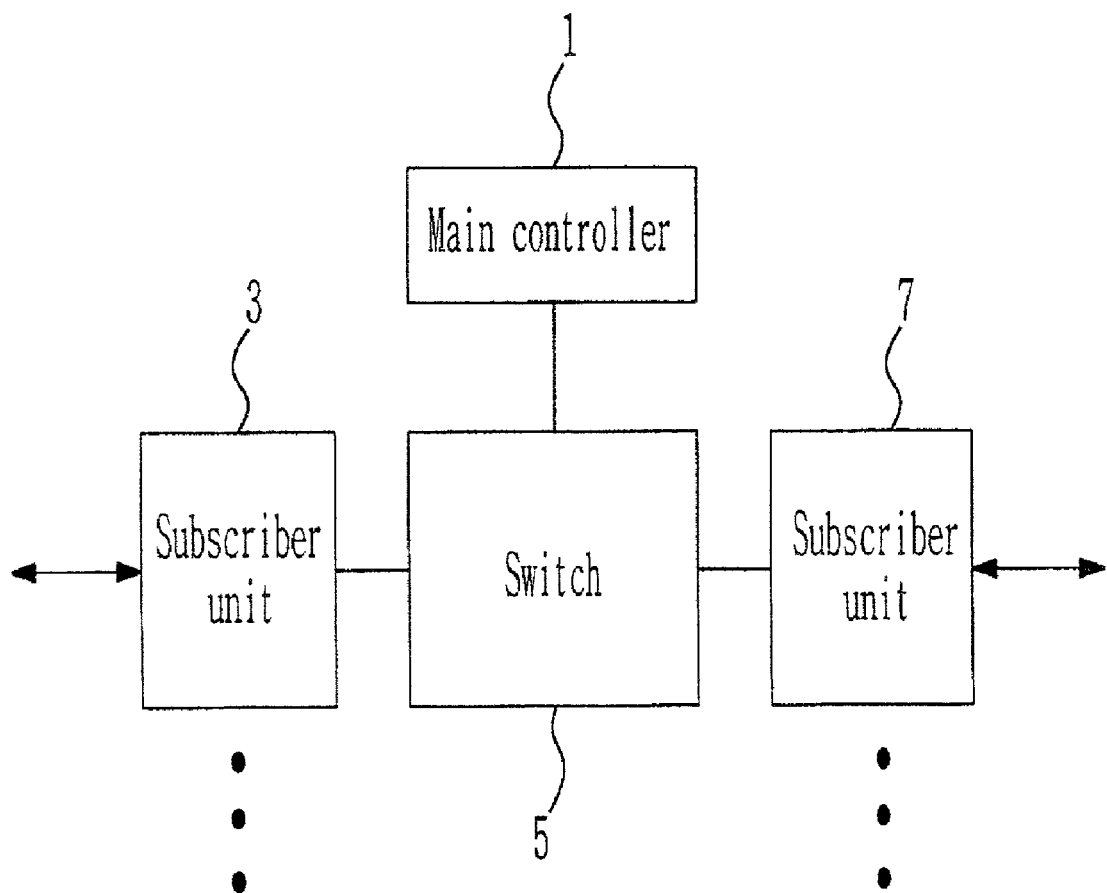
FIG. 1 is a functional block diagram of a conventional ATM exchange.
Figure 2:
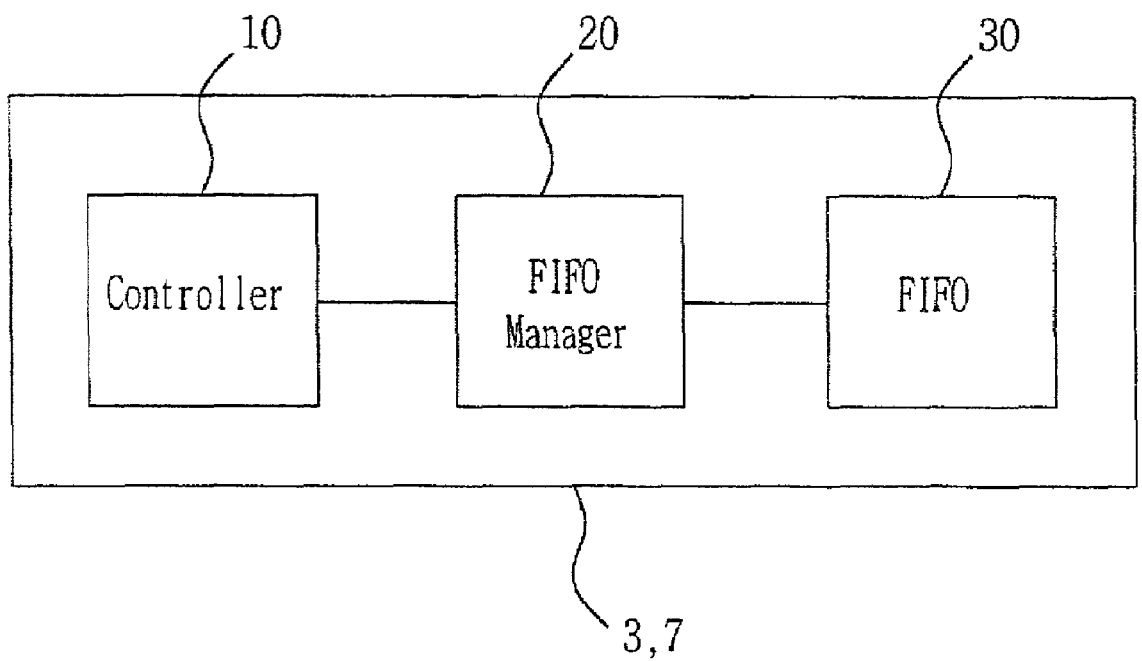
FIG. 2 is a detailed functional block diagram of a subscriber unit in FIG. 1.
Figure 3:
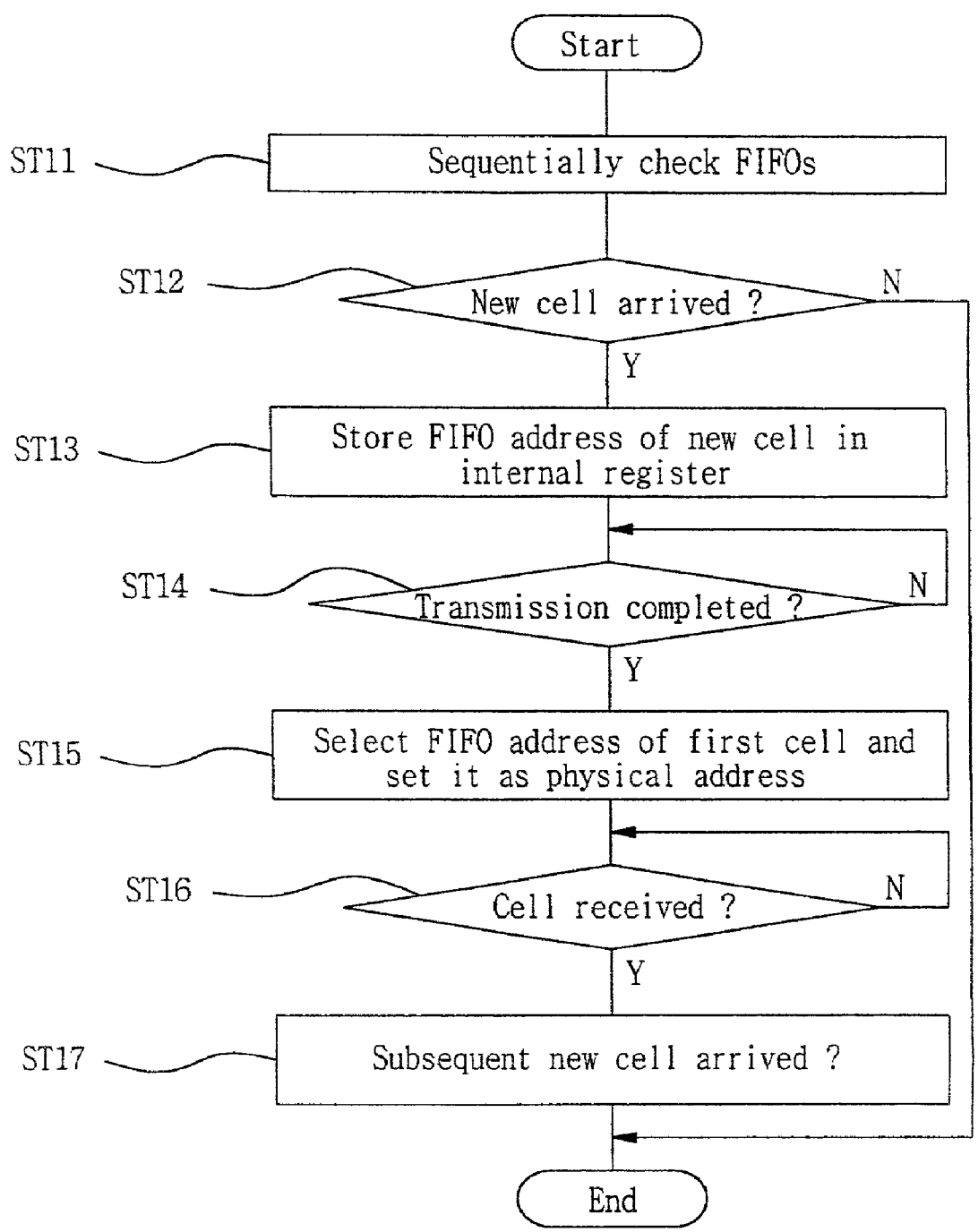
FIG. 3 is a flow chart illustrating a conventional control cell processing method.

FIG. 1
1: main controller
3, 7: subscriber unit
5: switch
FIG. 2
10: controller
20: FIFO manager
FIG. 3
Start
ST11: sequentially check FIFOs
ST12: new cell arrived ?

ST13: store FIFO address of new cell in internal register
ST14: transmission completed ?
ST15: select FIFO address of first cell and set it as physical address
ST16: cell received ?
ST17: subsequent new cell arrived ?
End
FIG. 4
10': controller
20': FIFO manager
31: transmission FIFOx4
32: reception FIFOx4
FIG. 5
Start
ST21: transmit signal cell or control cell
ST22: sequentially check reception FIFOs to determine whether new cell has arrived
ST23: recognize current cell to be abnormal if there is no SOC signal in initial byte of current cell under condition that Cell_Sync_Loss is present in cell, or if SOC signal is detected during cell transfer
ST24: if Cell_Sync_Loss becomes abnormal, discard current cell and fully empty corresponding FIFO to recover cell synchronization
End
FIG. 6
ST44: transmit first byte of cell to be transmitted
ST47: transmit Ith byte
ST48: cell to be received ?
ST50: transmit first byte of cell to be received
ST53: transmit Ith byte
ST62: read all data from Rx FIFO to fully empty Rx FIFO

What is claimed is:

1. A method for recovering abnormal control cells in an asynchronous transfer mode (ATM) exchange subscriber unit, comprising:
 transmitting a signal cell or control cell and then sequentially checking a plurality of reception first-in first-out memories (FIFOs) to determine whether a new cell has arrived;
 recognizing that the current cell is abnormal after said transmitting is performed, if there is no start of cell (SOC) signal in an initial byte of a current cell under the condition that a cell synchronization loss signal is present in the current cell, or if the Soc signal is detected during transfer of the current cell; and
 discarding the current cell and fully emptying an associated FIFO to recover cell synchronization if the cell synchronization loss signal is abnormal during said recognizing,
 wherein said discarding includes:
 setting to 0 all bytes to be transmitted under the condition that said synchronization loss signal is not set if the current cell in transmission is abnormal; and
 setting no transmission synchronous signal and then returning to said transmitting.

2. The method as set forth in claim 1, wherein said transmitting includes:
 first determining whether there is a cell to be transmitted;
 transmitting the cell and then returning to said determining if it is determined that there is the cell to be transmitted;
 second determining whether there is a cell to be received if it is determined that there is no cell to be transmitted;
 returning to said first determining if it is determined that there is no cell to be received; and
 receiving the cell and then returning to said first determining if it is determined at said second determining that there is the cell to be received.

3. The method as set forth in claim 2, wherein said first determining includes:
 determining that the cell synchronization is normal, if said cell synchronization loss signal has been set; and
 determining that there is the cell to be transmitted, if a transmission enable signal is detected.

4. The method as set forth in claim 2, wherein said transmitting includes:
 determining whether a transmission synchronous signal is detected from an initial byte of the cell to be transmitted;
 transmitting the initial byte if it is determined that the transmission synchronous signal is detected from the initial byte; and
 determining whether the transmission synchronous signal is detected from the cell to be transmitted, in order from a subsequent byte to a last byte, transmitting each of the bytes whenever the transmission synchronous signal is detected and then returning to said first determining whether there is a cell to be transmitted.

5. The method as set forth in claim 4, wherein the cell to be transmitted has 64 bytes.

6. The method as set forth in claim 2, wherein said receiving the cell includes:
 determining whether a reception synchronous signal is detected from an initial byte of the cell to be received;
 receiving the initial byte if it is determined that the reception synchronous signal is detected from the initial byte; and
 determining whether the reception synchronous signal is detected from the cell to be received, in order from a subsequent byte to a last byte, receiving each of the bytes whenever the reception synchronous signal is detected and then returning to said first determining.

7. The method as set forth in claim 6, wherein the cell to be received has 64 bytes.

8. The method as set forth in claim 1, wherein the current cell at said recognizing is in any one of transmission or reception.

9. The method as set forth in claim 1, wherein the current cell at said discarding is in any one of transmission or reception.

10. The method as set forth in claim 9, wherein said discarding includes:
 setting to 0 all bytes to be received under the condition that said synchronization loss signal is not set if the cell in reception is abnormal; and
 setting no reception synchronous signal, reading data from an associated one of said reception FIFOs until it is fully emptied, and then returning to said transmitting.

11. An apparatus for recovering abnormal control cells in an asynchronous transfer mode (ATM) exchange subscriber unit, comprising:
 a controller for monitoring and controlling the entire operation of the subscriber unit, and discarding abnormal cells and recovering cell synchronization on the basis of a start of cell (SOC) signal;
 a first-in first-out memory (FIFO) manager connected to said controller for transmitting and receiving cells to/from said controller;
 reception FIFO means for temporarily storing a cell received from a different ATM exchange and transmitting the stored cell to said FIFO manager; and transmission FIFO means for temporarily storing a cell transmitted from said FIFO manager and transmitting the stored cell externally, wherein said discarding includes:

setting to 0 all bytes to be transmitted under the condition that a synchronization loss signal is not set if a current cell in transmission is abnormal; and setting no transmission synchronous signal and then returning to said transmitting the stored cell externally.

12. The apparatus as set forth in claim 11, wherein said reception FIFO means includes four FIFOs for inputting and outputting cells.

13. The apparatus as set forth in claim 11, wherein said transmission FIFO means includes four FIFOs for inputting and outputting cells.

* * * * *